(12) United States Patent
White et al.

(10) Patent No.: US 10,651,572 B1
(45) Date of Patent: May 12, 2020

(54) BONDING JUMPER SYSTEM

(71) Applicant: Meter Technology Werks, LLC, Tampa, FL (US)

(72) Inventors: Matthew White, Tampa, FL (US); Martin Cole, Ocala, FL (US); Eric Allard, Plant City, FL (US)

(73) Assignee: Meter Technology Werks, LLC, Tampa, FL (US)

( * ) Notice: Subject to any disclaimer, the term of this patent is extended or adjusted under 35 U.S.C. 154(b) by 0 days.

(21) Appl. No.: 16/436,822

(22) Filed: Jun. 10, 2019

(51) Int. Cl.
*H01R 4/64* (2006.01)
*F16L 25/01* (2006.01)

(52) U.S. Cl.
CPC .............. *H01R 4/64* (2013.01); *F16L 25/01* (2013.01)

(58) Field of Classification Search
CPC .................................. H01R 4/64; F16L 25/01
USPC .......................................................... 439/192
See application file for complete search history.

(56) References Cited

U.S. PATENT DOCUMENTS

| | | | |
|---|---|---|---|
| 1,590,590 A | 12/1923 | Seymour | |
| 3,128,624 A * | 4/1964 | Wesp | G01K 17/12 374/40 |
| 3,860,742 A * | 1/1975 | Medney | F16L 25/01 174/845 |
| 3,891,291 A * | 6/1975 | Nadsady | F16L 25/01 439/192 |
| 4,008,937 A * | 2/1977 | Filippi | F16L 23/06 439/192 |
| 4,106,832 A | 8/1978 | Winter | |
| 5,164,545 A | 11/1992 | Kreinberg | |
| 5,557,041 A * | 9/1996 | Sanford, Jr. | G01F 15/14 73/201 |
| 5,620,210 A * | 4/1997 | Eyster | F16L 21/06 24/625 |
| 6,329,592 B1 | 12/2001 | Auclair | |
| 6,880,859 B2 * | 4/2005 | Breay | F16L 21/06 285/1 |
| 7,431,593 B2 | 10/2008 | Hunter | |
| 8,109,131 B2 | 2/2012 | Margalit et al. | |
| 8,192,210 B2 | 6/2012 | Gardner | |
| 8,356,390 B2 * | 1/2013 | Flynn | F16L 23/06 24/270 |
| 8,387,454 B2 * | 3/2013 | Margalit | G01F 1/06 137/343 |
| 9,261,211 B2 * | 2/2016 | Schooley | F16L 23/06 |
| 9,360,144 B2 * | 6/2016 | Carns | F16L 25/01 |
| 2005/0023824 A1* | 2/2005 | Breay | F16L 21/06 285/1 |

(Continued)

*Primary Examiner* — Harshad C Patel
(74) *Attorney, Agent, or Firm* — Maxey-Fisher, PLLC; Brittany J. Maxey-Fisher

(57) ABSTRACT

An embodiment of a bonding jumper systems can include one bonding jumper comprising an electroconductive material. The bonding jumper can be a member comprising an inlet end and an outlet end. The at least one bonding juniper can be configured to be mechanically coupled to a water meter body. The water meter can comprise an inlet and outlet that both comprise an electroconductive fitting. The inlet end is mechanically coupled to the inlet to initiate an electrical coupling and the outlet end is mechanically coupled to the outlet to complete the electrical coupling. The bonding jumper system can further include a cover configured to encapsulate the meter body and the at least one bonding jumper.

18 Claims, 7 Drawing Sheets

(56) References Cited

U.S. PATENT DOCUMENTS

2013/0328307 A1\* 12/2013 Irwin ........................ F17D 5/08
285/422

\* cited by examiner

BONDING JUMPER SYSTEM

TECHNICAL FIELD

Some implementations relate generally to grounding for water distribution system, and more particularly, to a bonding jumper for a water meter.

BACKGROUND

Grounding a building or structure provides a path for electricity to flow to the earth should a problem, such as a short circuit, occur. For example, in buildings, the electrical systems are grounded from the electrical panel to the water supply line where the line enters the building. A missing jumper wire at a water meters of the water supply line is an electrical defect and potential safety hazard. In particular, a section of the water pipes could energize and deliver an electrical shock to a service provider. The safety hazard could be initiated when a water meter is serviced or replaced on the water supply line. The necessity of the bonding jumper is because the body of the meter is poly non-conductive type.

SUMMARY

Some or all of the above needs and/or problems may be addressed by certain embodiments of the disclosure. Certain embodiments of the disclosure can include systems and devices for grounding water meters within piping systems. An embodiment of a bonding jumper systems can include a one bonding jumper comprising an electroconductive material. The bonding jumper can be a member comprising an inlet end and an outlet end. The at least one bonding jumper can be configured to be mechanically coupled to a water meter body. The water meter can comprise an inlet and outlet that both comprise an electroconductive fitting. The inlet end is mechanically coupled to the inlet to initiate an electrical coupling and the outlet end is mechanically coupled to the outlet to complete the electrical coupling. The bonding jumper system can further include a cover configured to encapsulate the meter body and the at least one bonding jumper.

Another embodiment of a bonding jumper system can include a meter body comprising an inlet that comprises an electroconductive fitting and an outlet that comprises an electroconductive fitting. The embodiment can further include at least one bonding jumper. The bonding jumper can comprise an electroconductive material. The bonding jumper can further comprise an inlet end and an outlet end. The inlet end can be mechanically coupled to the inlet to initiate an electrical coupling. The outlet end can be mechanically coupled to the outlet to complete the electrical coupling.

A method for installing a bonding jumper system comprising: coupling a meter body comprising an inlet that comprises an electroconductive fitting and an outlet that comprises an electro-conductive fitting to an external piping system comprising an exit fitting and an entry fitting, wherein the inlet is mechanically coupled to the exit fitting and the outlet is mechanically coupled to the entry fitting and; coupling at least one bonding jumper comprising an electroconductive material, further comprising an inlet end and an outlet end, to the meter body, wherein the inlet end is mechanically coupled to the inlet to initiate an electrical coupling and wherein the outlet end is mechanically coupled to the outlet to complete the electrical coupling.

Other embodiments, features, and aspects of the disclosure are described in detail herein and are considered a part of the claimed disclosure. Other embodiments, features, and aspects can be understood with reference to the following detailed description, accompanying drawings and claims.

DETAILED DESCRIPTION

Figure 1:
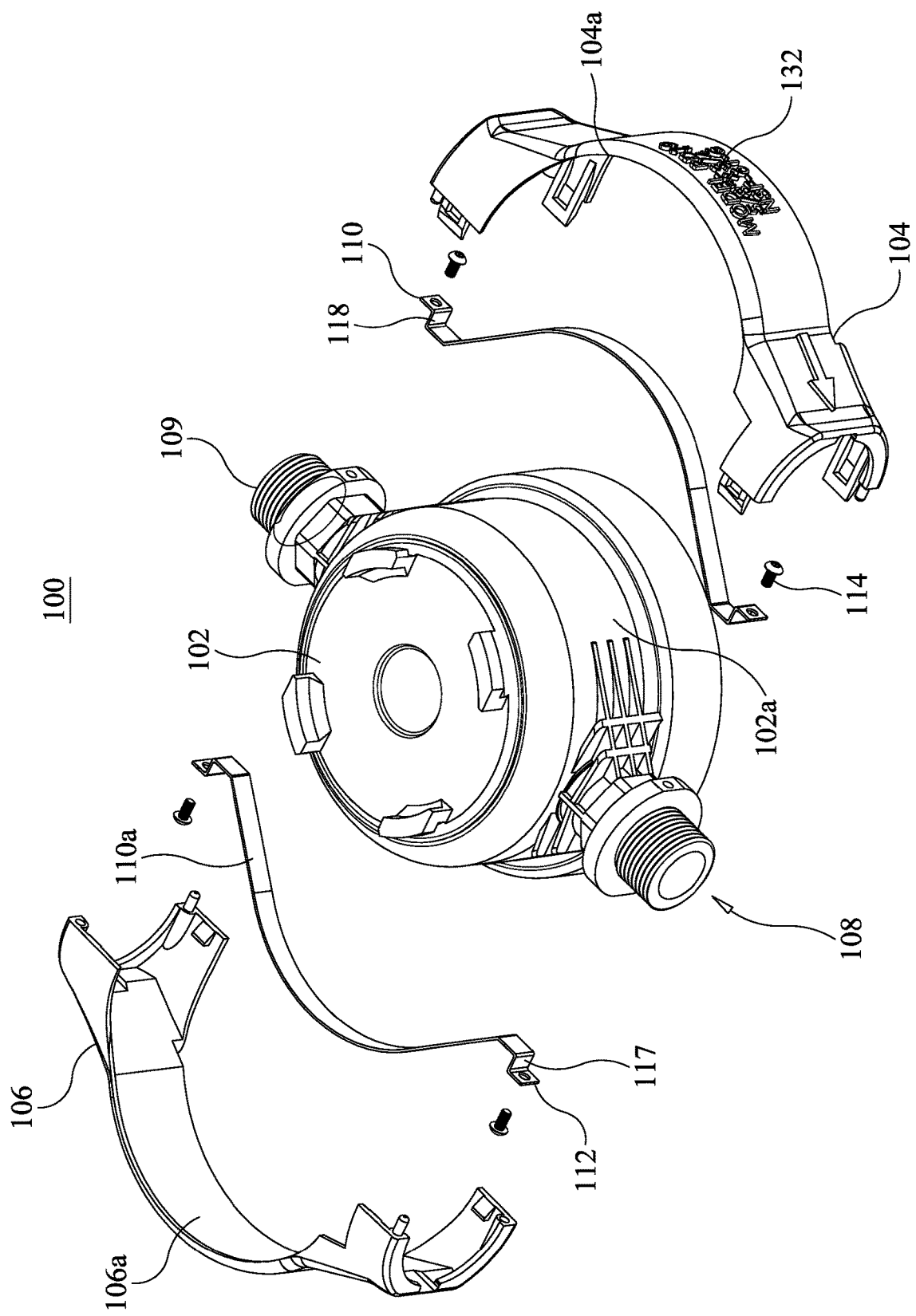
FIG. 1 is a diagram of an example water meter with a bonding jumper showing a fully exploded view in the disclosure.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The following description is provided as an enabling teaching of the disclosed articles, systems, and methods in their best, currently known embodiments. To this end, those skilled in the relevant art will recognize and appreciate that many changes can be made to the various aspects of the articles, systems, and methods described herein, while still obtaining the beneficial results of the disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a gasket" can include two or more such gaskets unless the context indicates otherwise.

As used throughout, "substantially" with respect to a measure can refer to a range of values comprising +1-10 degrees. For example, substantially orthogonal, normal, or parallel can include embodiments, where the referenced components are oriented +/−10 degrees of being classified as orthogonal, normal or parallel respectively Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

The electroconductive as used herein mean the ability to facilitate the flow of electrons (electricity) through at least: a structure, material, or pathway.

To properly ground a water piping system, there should a continuous electrical conduit passing from the waterline into the ground, shown in FIGS. 1-6, the bonding jumper system (system) 100 can include a bonding jumper 110 and a cover 104. In an alternate embodiment the system can further include a water meter 101. The bonding jumper 110 can be mechanically coupled to the water meter 101 using a fastener, such as a machine screw 114. In alternative embodiments, the fastener 114 can comprise other mechanical fasteners, which can mechanically couple the bonding jumper 110 to the meter 101. In further aspects, the mechanical fasteners can also serve the purpose of maintaining an electrical conduit between the exit fitting 122 of a water pipe 125, the bonding jumper 110 coupled to the meter 101 and the entry fitting 124 of a water pipe 125.

Figure 2:
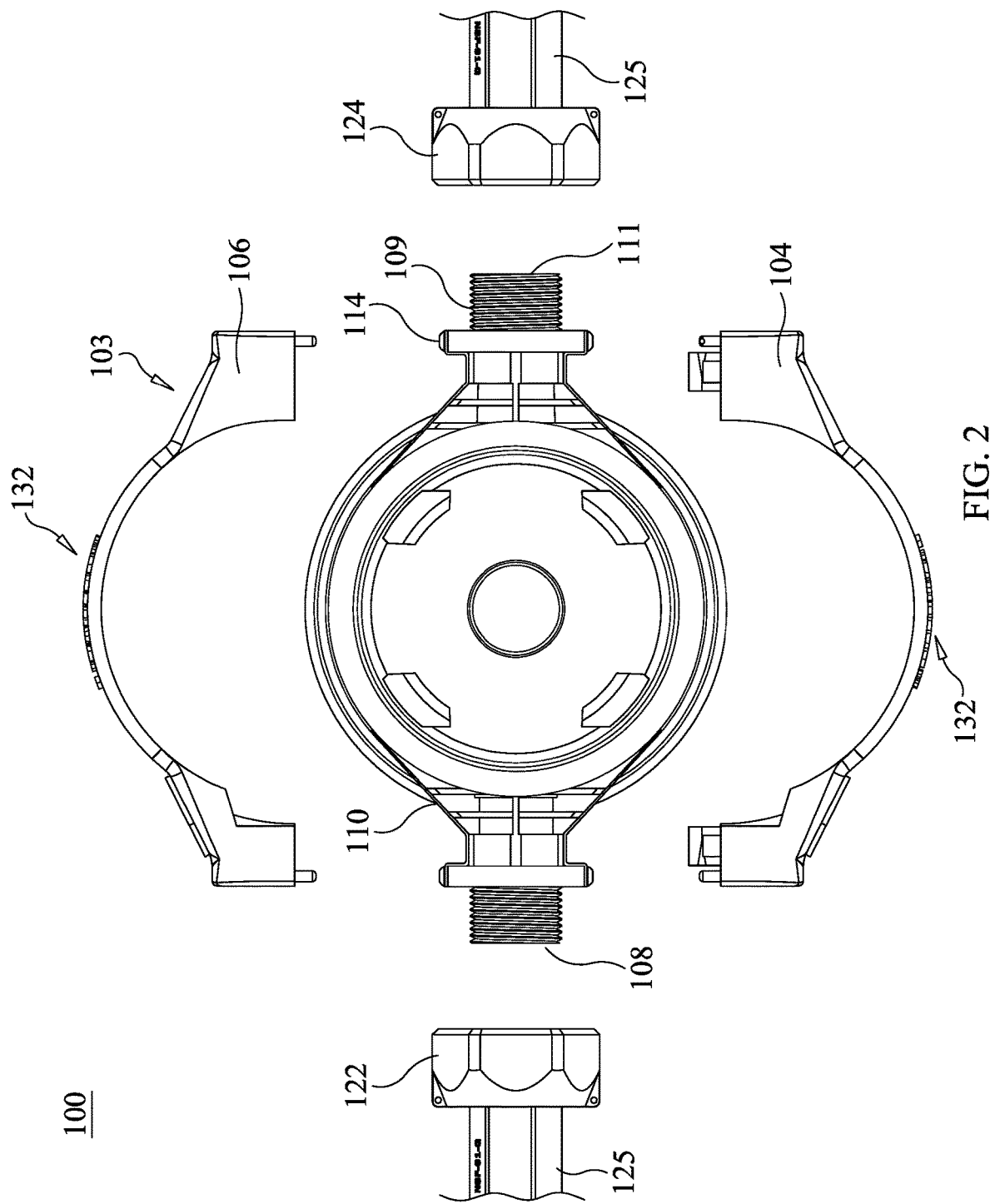
FIG. 2 is a diagram of an example water meter with a bonding jumper showing a partially exploded view of the illustrative embodiment in FIG. 1

As shown FIG. 2, the water meter 101 can comprise a meter body 102. The meter body 102 can comprise an inlet 108 where water can flow into the meter and an outlet 111 where water can flow out of the meter. In a further aspect of the embodiment, the inlet 108 and the outlet 111 can be configured with fittings 122, 124 to engage the piping from the water supply system 125. The fitting 109 can be configured with a screw-type profile to mechanically engage a mated-screw type fitting 122,124 attached to the piping of the water supply piping system 125. In a further aspect of the embodiment, the fittings 109 at the water meter inlet 108 and outlet 111 can be comprised of electroconductive material such as a metal. The electroconductive material can be consistent with metals typically used in pipe fitting applications such as but not limited to copper, brass, iron, or stainless steel.

In one aspect, the meter 101 includes a water meter body 102 that may be formed from plastic (or other nonconductive material). In such an embodiment, the non-electroconductive meter body 102 can be mechanically coupled to the electroconductive fittings at the inlet 108 and outlet 111. Another feature of the bond jumping system 100, is the bonding jumper 110. The bonding jumper 110 can be an electroconductive material that spans the inlet 108 and outlet 111 of the water meter 100 and is connected through fasteners 114. Similar to the fittings 109, the bonding jumper material can comprise of electroconductive materials such as, but not limited to, brass, copper, lead, steel, iron, etc. In a further aspect, the cross section of the bonding jumper can be various geometric shapes such as but not limited to a circle, rectangle or square. In another aspect, the bonding jumper 110 can have a cross-sectional area consistent with various wire gages. The wire gages can range between the standard wire gages of 0 to 30 mil. However, additional gages are possible. In yet a further aspect, the bonding jumper 110 can comprise a braided configuration such as a braided wire. The braided wire configuration can be used to vary and augment the cross-sectional area of the bonding jumper 110. In yet another configuration, the bonding jumper 110 can comprise multiple materials to apply electroconductivity properties that may properly suit electrical coupling with the materials of a particular piping system. For example, the bonding jumper can be configured to conduct a given amount of current per a specification (e.g., a building code, plumbing code, utilities code, electrical code, or other applicable code, etc.).

Figure 3:
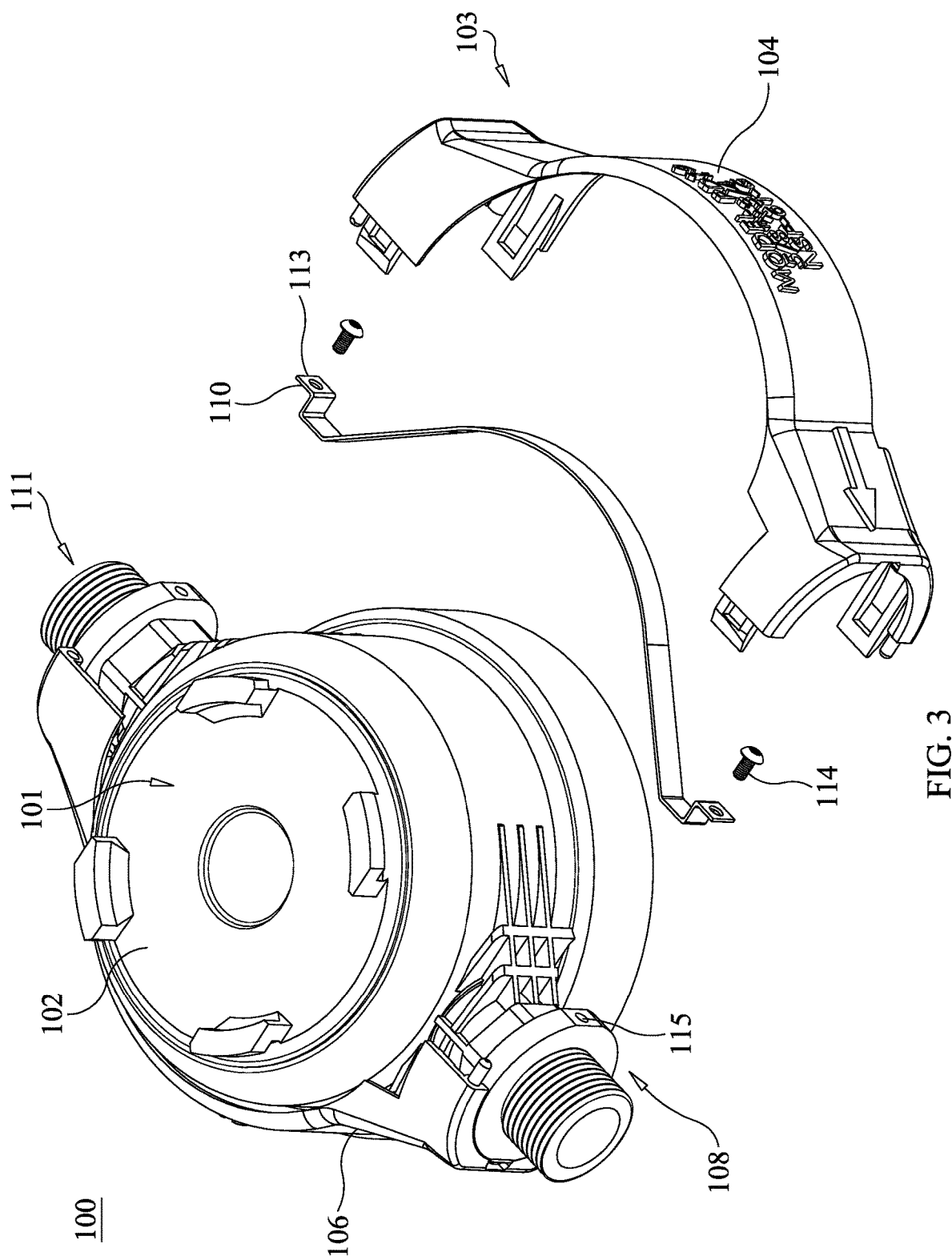
FIG. 3 is a diagram of an example water meter with a bonding jumper showing a partially exploded view of the illustrative embodiment in FIG. 1

In a further aspect as shown in FIGS. 1-3, the bonding jumper 110 can be physically configured such that the interior profile 110a conforms to the exterior profile 102a of the water meter body 102. In a further aspect, the inlet end 117 and the outlet end 118 can define apertures 113. The fasteners 114 can include metal machine screws that are manufactured to pass through the apertures 112 and 113 on the first bonding jumper 110 and engage receptacles 115 on the inlet 108 and outlet 111 respectively to secure the bonding jumper 110 to the meter body 102.

This configuration of the bonding jumper 110 can provide additional safety and stability for the bonding jumper systems because the bonding jumper 110 can be in close proximity to the water meter 101. Further, this configuration can reduce the loss of electrical conductivity, as opposed to other configurations where bonding wires hang loose from the piping system or extend far away from the water meter. Further, mechanically coupling the bonding jumper to the electroconductive fittings 109 can insure that water supply piping in grounded.

Figure 4:
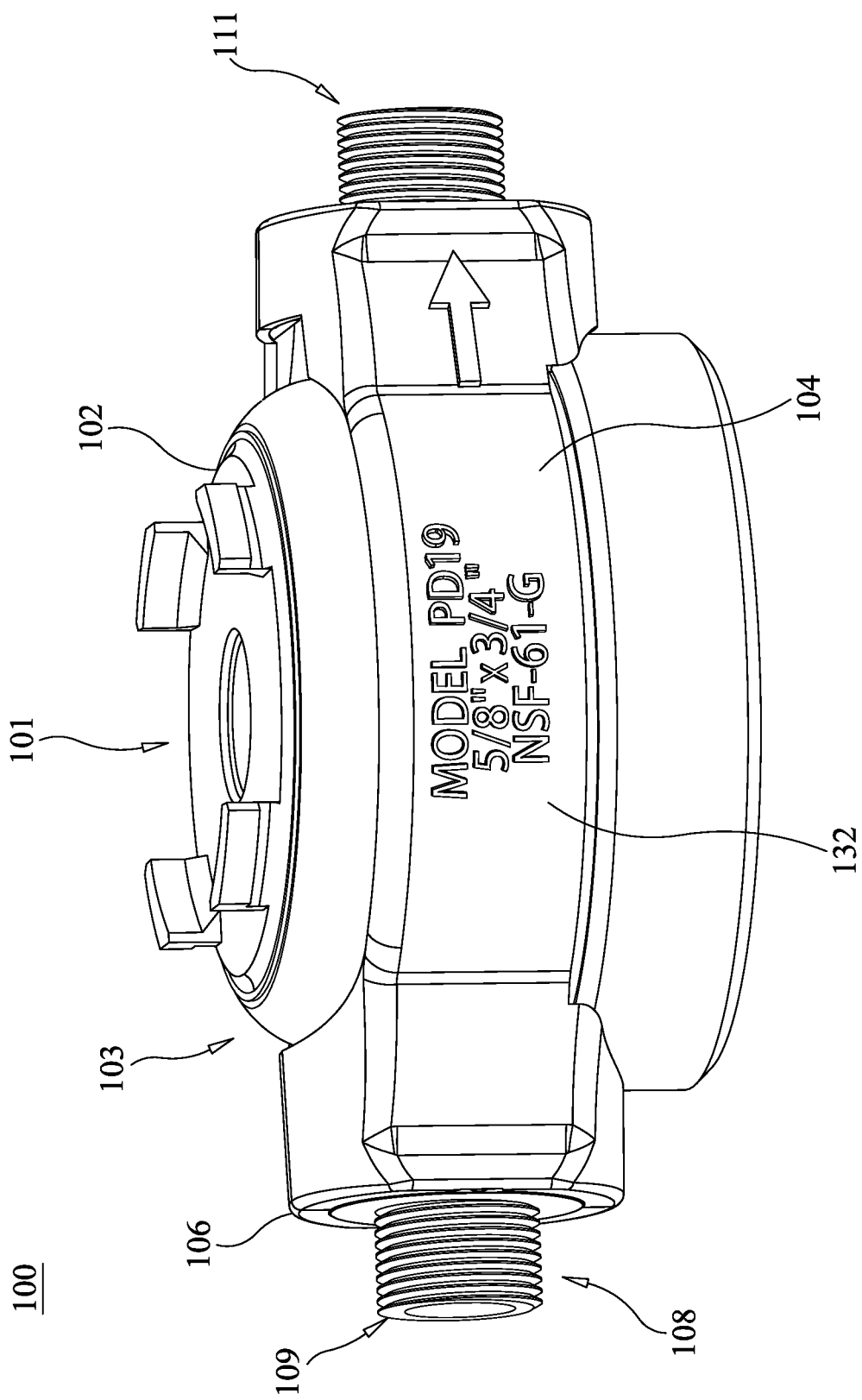
FIG. 4 is a diagram of an example water meter with a bonding jumper of the illustrative embodiment in FIG. 1
Figure 5:
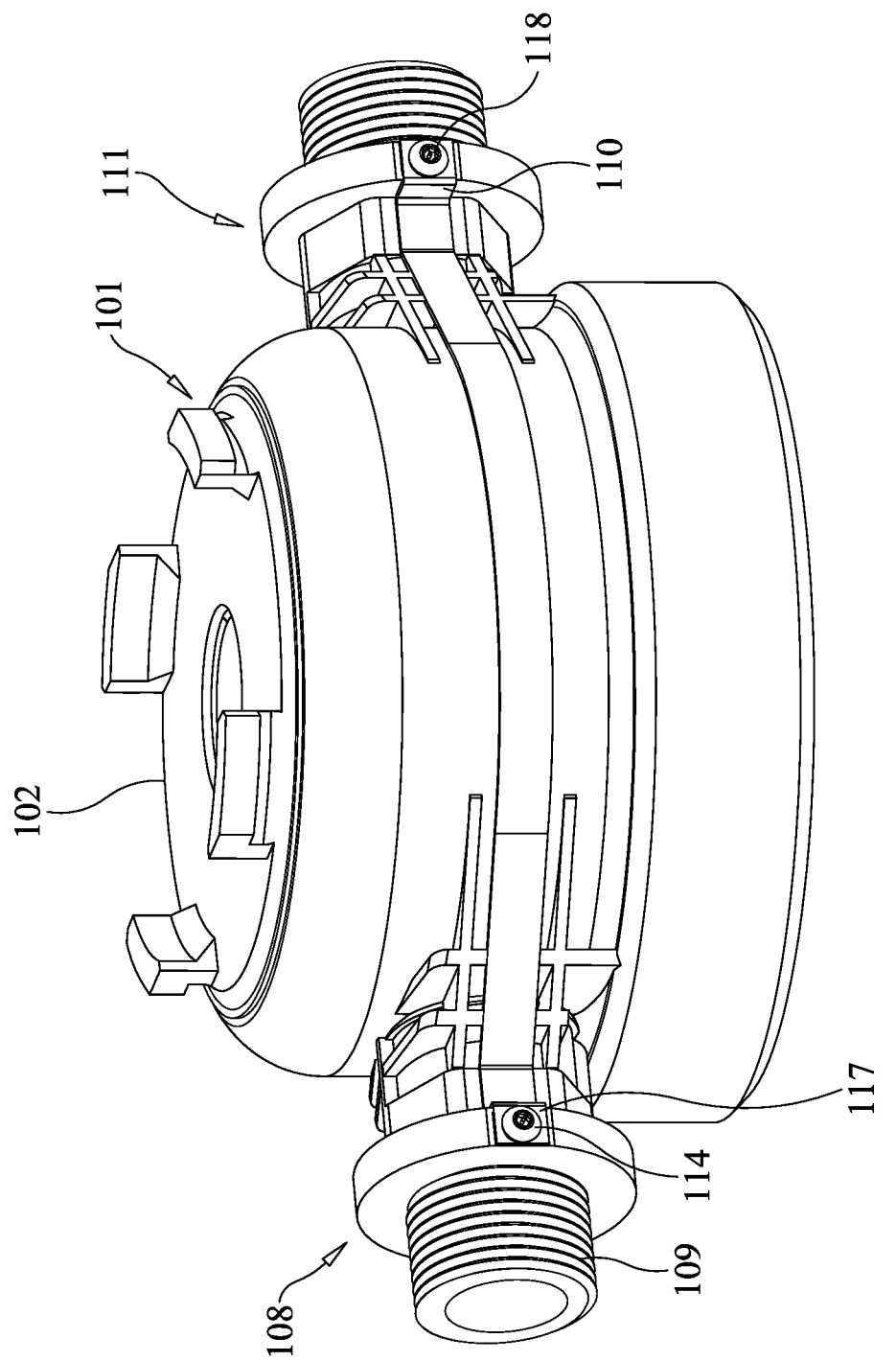
FIG. 5 is a diagram of an example water meter with a bonding jumper of the illustrative embodiment in FIG. 1.
Figure 6:
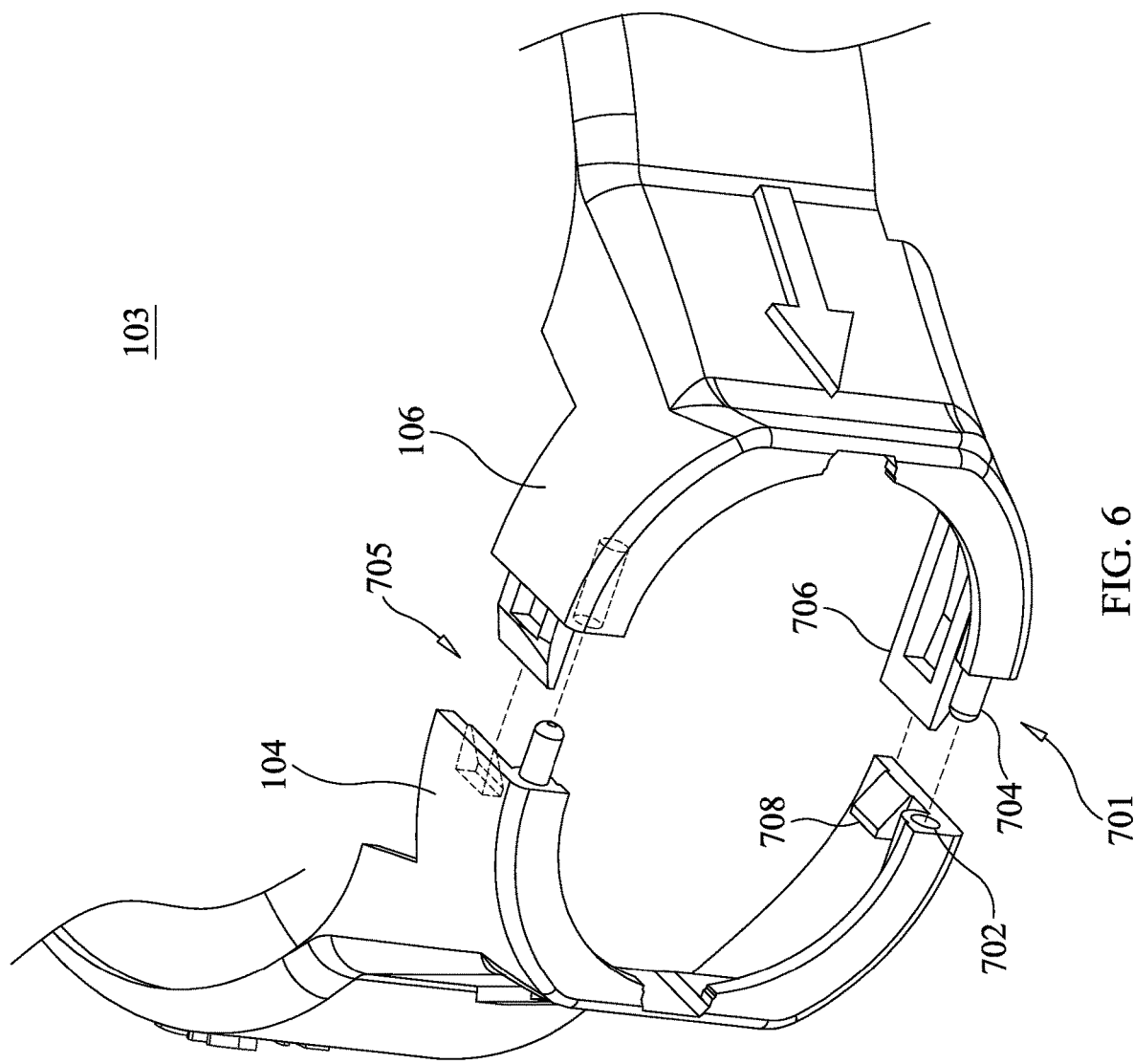
FIG. 6 is a diagram of an example water meter with a bonding jumper in accordance with some implementations.

As shown in FIGS. 4 and 6 the bonding jumper system can include a cover 103. The cover 103 can be configured to encapsulate the water meter body 102 and bonding jumper 110 with the cover including the specification indicator 132. In this configuration the cover 103 can provide protection to the couplings between the bonding jumper 110 and the meter body 102. In one aspect of the embodiment, the cover 103 can be comprised of a non-electroconductive material such as but not limited to a plastic, polymer, or structurally reinforced silicone. In a further aspect, the cover 103 can be a unitary piece of material. In yet another aspect, the cover 103 can comprise multiple portions. For example, the cover 103 can include a first portion 104 and a second portion 106. When the first portion 104 and the second portion 106 are coupled they can form a unitary cover 103 to protect the bonding jumper 110 and meter body 102. Further, the first portion 104 can have an interior profile 104a and the second portion 106 can have an interior profile 106a that conforms to the exterior shape. The cover 103 has a poka-yoke feature that only allows the arrow on the cover 103 to be oriented in the same direction as the arrow on the meter body 102 in order to provide a proper register of water flow.

Figure 7:
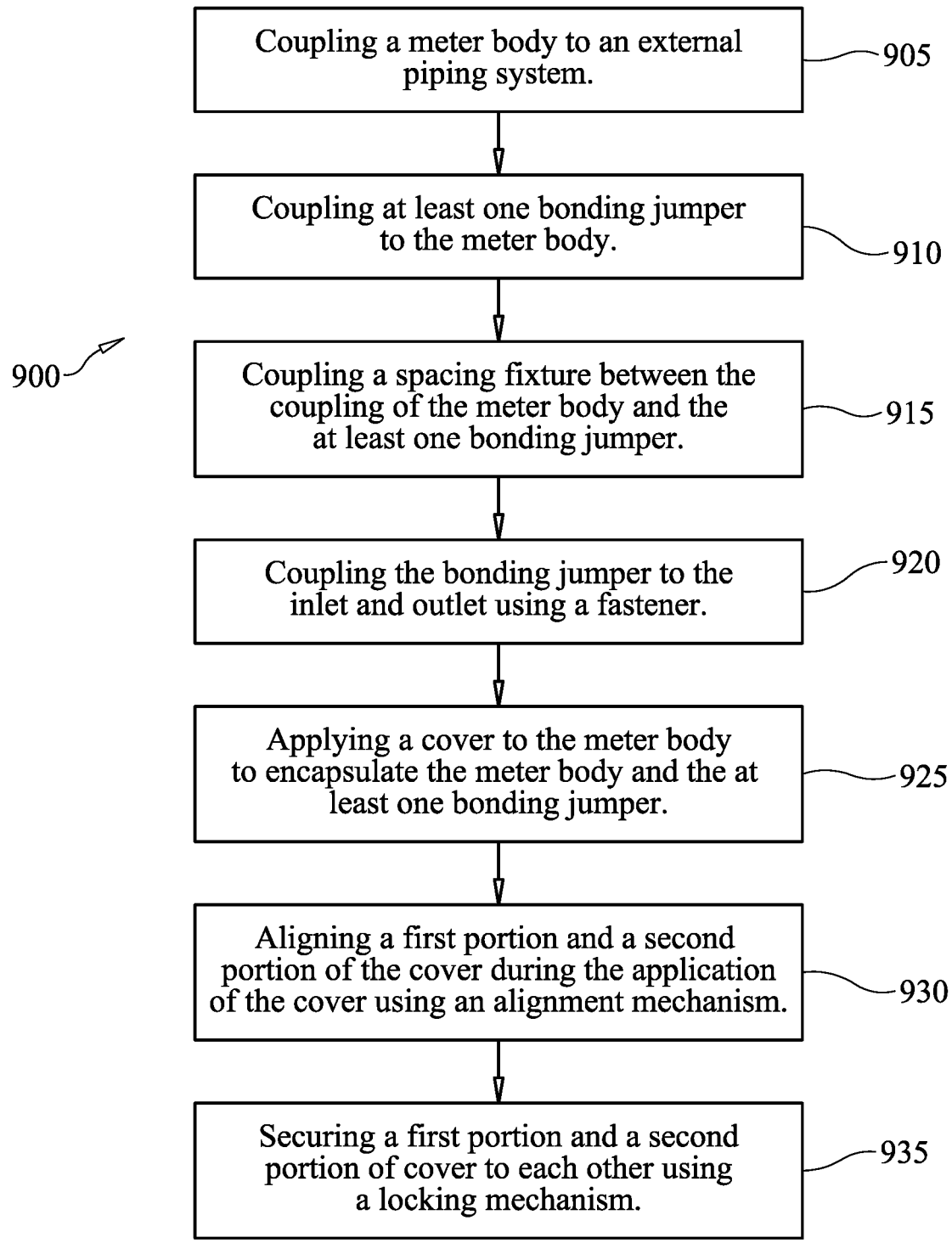
FIG. 7 is a block diagram displaying a method for installing a bonding jumper system.

In a further aspect, as shown in FIG. 7, the first portion 104 and the second portion 106 of the cover 103 can be coupled using an alignment mechanism 701. In one aspect the first cover portion 104 includes a first bonding jumper alignment member, such as a peg 704 and the second portion 106 defines a receptacle 702 for receiving the peg 704. It is also considered that another alignment mechanism could be used to properly align the first 104 and second portion 106 during coupling. For example, a dove tail joint can be used wherein one portion 104 can include a pin and the second portion 106 can define the channel for receiving the pin.

In another aspect the coupling of the first 104 and second portion 106 can be secured with a locking mechanism 705. For example. the first bonding jumper latch member 708 engages and latches with the second bonding jumper cover latch member 706 to secure the two bonding jumper cover portions (104 and 106) together. In another aspect the locking mechanism 705b can comprise apertures defined by the first cover portion 104 and the second cover portion 106, wherein the apertures are aligned such that a pin, padlock or zip tie could be passed through the apertures, locking the portions loops to log the cover 103 together.

FIG. 8 is a flowchart representing an example method for installing the bonding jumper system. The example method 900 can be implemented by the system 100 or 200. The operations described and shown in the method 900 of FIG. 8 may be carried out or performed in any suitable order as desired in various embodiments of the disclosure. Additionally, in certain embodiments, at least a portion of the operations may be carried out in parallel. Furthermore, in certain embodiments, less than or more than the operations described in FIG. 8 may be performed. The method 900 can start in block 905, and according to an example embodiment of the disclosure, can include coupling a meter body to an external piping system comprising an exit fitting and an entry fitting. In a further aspect, the inlet of the meter body is mechanically coupled to the exit fitting and the outlet of the meter body is mechanically coupled to the entry fitting.

Block 910 can include coupling at least one bonding jumper comprising an electroconductive material to the meter body. In a further aspect, an inlet end of the bonding jumper can be coupled to the inlet of the meter body. The outlet end of the bonding jumper can be coupled to the outlet end of the meter body. The coupling of the bonding jumper to the meter body can complete the electrical coupling between the water pipes through the bonding jumper system wherein the inlet end is mechanically coupled to the inlet to initiate an electrical coupling and wherein the outlet end is mechanically coupled to the outlet to complete the electrical coupling.

In a further aspect of method 900, method 915 can include coupling a spacing fixture between the coupling of the meter body and the at least one bonding jumper. In a further aspect of method 900, block 920 can comprise coupling the bonding jumper to the inlet and the outlet using a fastener. Using a fastener can secure the coupling between the bonding jumper and the meter body.

Block 925 can include applying a cover to the meter body to encapsulate the meter body and the at least one bonding jumper. In a further aspect of block 930 can include aligning a first portion and a second portion of the cover during coupling using an alignment mechanism. In yet another aspect, block 935 can include locking the first portion to the second portion during couple using a locking mechanism.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosure, including the best modes, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bonding jumper system comprising:
at least one bonding jumper comprising an electroconductive material and further comprising an inlet end and an outlet end, wherein the at least one bonding jumper is configured to be mechanically coupled to a water meter body that comprises an inlet comprising an electroconductive fitting and an outlet that comprises an electroconductive fitting, and wherein the inlet end is mechanically coupled to the inlet to initiate an electrical coupling and wherein the outlet end is mechanically coupled to the outlet to complete the electrical coupling; and
a cover configured to encapsulate the meter body and the at least one bonding jumper.

2. The at least one bonding jumper of claim 1 comprising an interior profile that conforms to an exterior profile of the meter body.

3. The cover of claim 1 further comprising a first portion and a second portion wherein the first portion and the second portion are configured to be mechanically coupled.

4. The cover of claim 3 further comprising a locking mechanism to secure the mechanical coupling of the first portion and the second portion.

5. The cover of claim 3, wherein the first portion and the second portion are mechanically coupled with an alignment mechanism.

6. The bonding jumper cover of claim 1 further comprising a specification indicator.

7. The bonding jumper system of claim 1 further comprising at least one spacing fixture that is oriented and mechanically coupled between the at least one bonding jumper and the meter body.

8. The spacing fixture of claim 7, wherein the at least one spacing fixture comprises a profile configured to conform with the interior profile of the at least one bonding jumper and the exterior profile of the meter body.

9. A bonding jumper system comprising:
a meter body comprising an inlet that comprises an electroconductive fitting and an outlet that comprises an electroconductive fitting; and
at least one bonding jumper comprising an electroconductive material, further comprising an inlet end and an outlet end, wherein the inlet end is mechanically coupled to the inlet to initiate an electrical coupling and wherein the outlet end is mechanically coupled to the outlet to complete the electrical coupling; and a cover configured to encapsulate the meter body and the at least one bonding jumper.

10. The at least one bonding jumper of claim 9 comprising an interior profile that conforms to an exterior profile of the meter body.

11. The meter body of claim 9 wherein the meter body in non-electroconductive.

12. The bonding jumper of claim 9, wherein the bonding jumper is electroconductive.

13. The cover of claim 9, comprising a first portion and second portion wherein the first portion and the second portion are configured to be mechanically coupled.

14. A method for installing a bonding jumper system comprising:

coupling a meter body comprising an inlet that comprises an electroconductive fitting and an outlet that comprises an electro-conductive fitting to an external piping system comprising an exit fitting and an entry fitting, wherein the inlet is mechanically coupled to the exit fitting and the outlet is mechanically coupled to the entry fitting and;

coupling at least one bonding jumper comprising an electroconductive material, further comprising an inlet end and an outlet end, to the meter body, wherein the inlet end is mechanically coupled to the inlet to initiate an electrical coupling and wherein the outlet end is mechanically coupled to the outlet to complete the electrical coupling; and applying a cover to the meter body that encapsulates the meter body and the at least one bonding jumper.

15. The method of claim 14 further comprising coupling a spacing fixture between the coupling of the meter body and the at least one bonding jumper.

16. The method of claim 14 wherein coupling the bonding jumper to the inlet and the outlet comprises using a fastener.

17. The method of claim 14, wherein applying the cover comprises, mechanically coupling a first portion and a second portion of the cover to encapsulate the meter body and the at least one bonding jumper.

18. The method of claim 14, wherein the first portion and the second portion are coupled using an alignment mechanism and locking mechanism.

\* \* \* \* \*